United States Patent
Pizzotti et al.

(10) Patent No.: US 10,693,376 B2
(45) Date of Patent: Jun. 23, 2020

(54) ELECTRONIC CONVERTER AND METHOD OF OPERATING AN ELECTRONIC CONVERTER

(71) Applicants: STMicroelectronics S.r.l., Agrate Brianza (IT); "ALMA MATER STUDIORUM"—UNIVERSITA' DI BOLOGNA, Bologna (IT)

(72) Inventors: Matteo Pizzotti, Misano Adriatico (IT); Michele Dini, Cattolica (IT); Aldo Romani, Rimini (IT); Rita Zappa, Milan (IT); Stefano Corbani, Pioltello (IT); Giulio Ricotti, Broni (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 0 days.

(21) Appl. No.: 16/551,984

(22) Filed: Aug. 27, 2019

(65) Prior Publication Data
US 2020/0076305 A1 Mar. 5, 2020

(30) Foreign Application Priority Data
Aug. 29, 2018 (IT) .................. 102018000008221

(51) Int. Cl.
*H02M 3/158* (2006.01)
*G05F 1/52* (2006.01)

(52) U.S. Cl.
CPC ............ *H02M 3/1582* (2013.01); *G05F 1/52* (2013.01)

(58) Field of Classification Search
None
See application file for complete search history.

(56) References Cited

U.S. PATENT DOCUMENTS

| 6,798,177 B1 | 9/2004 | Liu et al. | |
| 2008/0123374 A1* | 5/2008 | Vinciarelli | H02M 3/33592 363/65 |
| 2016/0365790 A1* | 12/2016 | Ye | H02M 3/1582 |
| 2018/0159426 A1* | 6/2018 | Vinciarelli | H02M 3/1582 |
| 2019/0222031 A1* | 7/2019 | Carpenter, Jr. | H02M 3/1582 |

OTHER PUBLICATIONS

Anonymous, "Understanding undervoltage lockout", Power House—Blogs—TI E2E Community, XP055576159, Jan. 19, 2017, 4 pages.

* cited by examiner

Primary Examiner — Jeffrey A Gblende
(74) Attorney, Agent, or Firm — Slater Matsil, LLP (57) ABSTRACT

An electronic converter has first and second input terminals, first and second output terminals, a current regulator circuit arranged between the first input terminal and an intermediate node, and input capacitor arranged between the intermediate node and the second input terminal, and an output capacitor. A control circuit block is configured to sense an input voltage, compare the regulated voltage to a reference value and generate a first signal, compare the input voltage to a lower threshold and an upper threshold and generate a second signal, switch the electronic converter between an active mode and an idle mode as a function of the first signal, and switch the electronic converter between a recharge phase and a switching phase as a function of the second signal when the electronic converter is in the active mode.

21 Claims, 3 Drawing Sheets

ELECTRONIC CONVERTER AND METHOD OF OPERATING AN ELECTRONIC CONVERTER

CROSS-REFERENCE TO RELATED APPLICATIONS

This application claims priority to Italian Patent Application No. 102018000008221, filed on Aug. 29, 2018, which application is hereby incorporated herein by reference.

TECHNICAL FIELD

Embodiments of the present disclosure relate to electronic converters.

BACKGROUND

Figure 1:
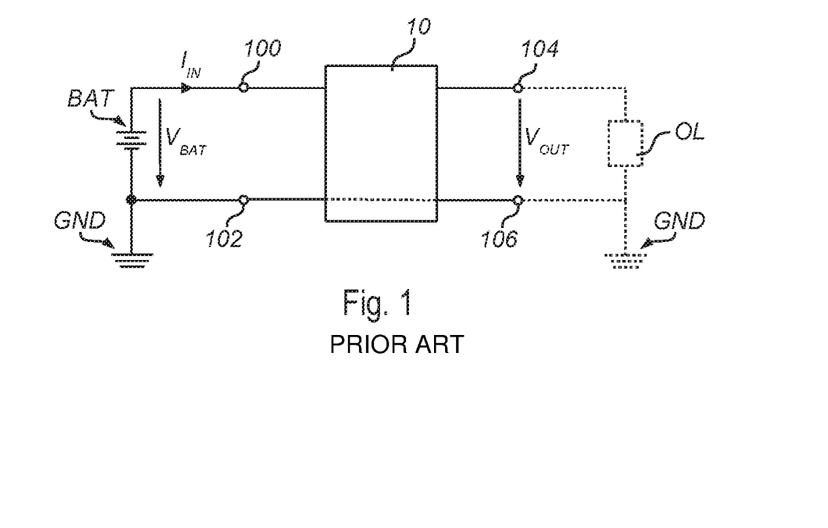

Electronic converters known in the art may be employed in an arrangement as exemplified in FIG. 1.

FIG. 1 shows a voltage source BAT, e.g. a battery, providing a voltage $V_{BAT}$ at terminals 100 and 102. In the example considered herein, the terminal 102 is coupled to a reference (ground) terminal GND, so that the voltage $V_{BAT}$ is measured with respect to a reference (ground) voltage, typically assumed as a zero-voltage level.

An electronic converter 10 may have an input port (i.e., a pair of input terminals) coupled to the terminals 100 and 102 to receive the input voltage $V_{BAT}$, and an output port for providing a regulated output voltage $V_{OUT}$ at the output terminals 104 and 106.

An output load OL may be coupled between the output terminals 104 and 106, thus being supplied with the regulated voltage $V_{OUT}$ provided by the electronic converter 10.

It will be appreciated that the output load OL, as well as the voltage source BAT, may be distinct elements from the embodiments of the present disclosure.

Optionally, the (negative) output terminal 106 of the electronic converter 10 may be coupled to the same reference (ground) terminal GND, as shown in FIG. 1 with dotted lines. However, such coupling is not mandatory.

For instance, the (negative) output terminal 106 may be coupled to a different reference terminal and the output voltage $V_{OUT}$ may be measured with respect to a different reference voltage, i.e., the voltage drop between the (negative) output terminal 106 and the reference (ground) terminal GND may be different from zero.

In the case of DC/DC converters, wherein an input DC voltage $V_{BAT}$ is converted into an output regulated DC voltage $V_{OUT}$, the output voltage $V_{OUT}$ may be higher, lower or equal to the input voltage $V_{BAT}$.

To this regard, different types of switching converters are known in the art: buck converters provide an output voltage $V_{OUT} < V_{BAT}$, boost converters provide an output voltage $V_{OUT} > V_{BAT}$, and buck-boost converters provide an output voltage $V_{OUT}$ which may be higher or lower than the input voltage $V_{BAT}$. Buck-boost converters are particularly well suited in case the required output voltage $V_{OUT}$ is quite close to the input voltage $V_{BAT}$.

It will be appreciated that such buck, boost and buck-boost electronic converters (as well as other converter architectures) are well known in the art, thus a more detailed description of such known converter architectures will not be provided in the present disclosure. For example, in this context may be cited document "Topologies for switched mode power supplies" by L. Wuidart, STMicroelectronics Application Note, 1999.

Moreover, it will be appreciated that reference to buck, boost and buck-boost converters is by way of example only, and that one or more embodiments may involve other converter architectures.

SUMMARY

Embodiments of the present disclosure relate to electronic converters. Specific embodiments of the present disclosure relate to electronic converters for low power electronic systems.

Various embodiments of the present disclosure provide solutions for generating a regulated (DC) voltage with input current regulation and increased energy efficiency.

As mentioned above, various embodiments of the present disclosure relate to an electronic converter.

In various embodiments, the electronic converter comprises a first input terminal and a second input terminal configured to receive a supply voltage therebetween (i.e., across them), and a first output terminal and a second output terminal configured to provide a regulated voltage therebetween.

In various embodiments, the electronic converter comprises a current regulator circuit arranged (connected) between the first input terminal and an intermediate node in the electronic converter, the current regulator circuit configured to regulate to a certain regulated value the current flowing between the first input terminal and the intermediate node.

In various embodiments, the electronic converter comprises an input capacitor arranged (connected) between the intermediate node and the second input terminal.

In various embodiments, the electronic converter comprises a switching stage having an input port coupled to the intermediate node and the second input terminal, and an output port coupled to the first and second output terminals.

In various embodiments, the electronic converter comprises an output capacitor arranged (connected) between the first output terminal and the second output terminal.

In various embodiments, the electronic converter comprises a control circuit block configured to sense an input voltage at the intermediate node and the regulated voltage at the first output terminal, compare the regulated voltage to a reference value and generate a first signal having first and second values indicative of the regulated voltage being higher or lower than the reference value, respectively, compare the input voltage to a lower and an upper threshold and generate a second signal having respective first and second values indicative of the input voltage reaching either one of the lower or the upper threshold, switch the electronic converter, as a function of the first signal, between an active mode, wherein a regulated current flows through the current regulator circuit between the first input terminal and the intermediate node to charge the input capacitor, and an idle mode, wherein energy transfer from the input capacitor to the output capacitor is inhibited and current flow through the current regulator circuit between the first input terminal and the intermediate node is discontinued, and as a result of the electronic converter being in the active mode, switch the electronic converter as a function of the second signal between a recharge phase, wherein energy transfer from the input capacitor to the output capacitor is inhibited, and a switching phase, wherein switching of one or more electronic switches in the switching stage is controlled by the control circuit block to enable energy transfer from the input capacitor to the output capacitor (e.g., by cyclically switching between the ON and OFF states of the electronic converter).

In various embodiments, the control circuit block is configured to switch the electronic converter to: the idle mode, as a result of the first signal having the first value indicative of the regulated voltage being higher than the reference value, and the active mode, as a result of the first signal having the second value indicative of the regulated voltage being lower than the reference value, and, as a result of the electronic converter being in the active mode, the control circuit block is configured to switch the electronic converter to the recharge phase, as a result of the second signal having the respective first value indicative of the input voltage having reached the lower threshold (e.g., having gone below the lower threshold), and the switching phase, as a result of the second signal having the respective second value indicative of the input voltage having reached the upper threshold (e.g., having gone above the upper threshold).

In various embodiments, the switching stage comprises one of a buck switching stage, a boost switching stage, a buck-boost switching stage.

In various embodiments, the regulated value of the current flowing between the first input terminal and the intermediate node as a result of the electronic converter being in the active mode is tunable by sensing a reference current generated by a reference current source coupled to the current regulator circuit, or (i.e., and/or) tuning the value of a variable component provided in the current regulator circuit.

In various embodiments, the lower and the upper thresholds are generated as a function of the supply voltage, with the lower threshold having a value preferably between 90% and 95% of the supply voltage, more preferably equal to 95% of the supply voltage, and the upper threshold having a value preferably between 97% and 100% of the supply voltage, more preferably equal to 99% of the supply voltage.

In various embodiments, the switching stage is switched plural times to an ON state and to an OFF state during the switching phase of the electronic converter.

In various embodiments, the electronic converter comprises an inductor providing a current flow path between the input capacitor and the output capacitor, the inductor coupled to an inductor port of the switching stage, wherein the inductor may be an external component.

In various embodiments, the control circuit block is configured to sense a current flowing through the inductor and to control the switching stage, as a result of the electronic converter being in the switching phase, by periodically switching the switching stage to an OFF state, and switching the switching stage to an ON state as a result of the current flowing through the inductor decreasing to zero.

In various embodiments, the control circuit block is configured to receive a clock signal generated by an oscillator circuit block, sense a current flowing through the inductor and generate a third signal indicative of the current flowing through the inductor decreasing to zero, generate a fourth signal having pulses in correspondence of rising or falling edges of the clock signal, and as a result of the electronic converter being in the switching phase, control the switching stage by switching the switching stage to an ON state as a result of the third signal being indicative of the current flowing through the inductor having decreased to zero, and switching the switching stage to an OFF state as a result of a pulse occurring in the fourth signal.

In various embodiments, the fourth signal has pulses in correspondence of rising edges of the clock signal, as a result of the clock signal being high when the electronic converter switches to the switching phase, or falling edges of the clock signal, as a result of the clock signal being low when the electronic converter switches to the switching phase.

In various embodiments, the fourth signal has pulses in correspondence of every $n^{th}$ rising or falling edge of the clock signal, n being an integer bigger or equal to one.

BRIEF DESCRIPTION OF THE DRAWINGS

Embodiments of the present disclosure will now be described with reference to the annexed drawings, which are provided purely by way of non-limiting example, and in which:

FIG. 1 has already been described in the foregoing;

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The inventors have observed that known electronic converters such as buck, boost and buck-boost switching converters have some drawbacks.

For instance, referring to FIG. 1, the switching activity of the electronic converter 10 may result in sharp current pulses of the input current $I_{IN}$ that flows from the voltage source BAT into the electronic converter 10 through the input terminal 100. In case the input terminals 100, 102 are supplied by means of a battery BAT, such input current $I_{IN}$ is sunk from the battery BAT, with the sharp current pulses possibly resulting in battery degradation over time.

Therefore, some kind of regulation and/or limitation of the input current $I_{IN}$ sunk by an electronic converter 10 would be beneficial in the case of battery-supplied electronic devices, insofar as such regulation and/or limitation results in increased battery lifetime.

However, input current regulation and/or limitation may lower the energy transfer efficiency from the input port to the output port of a conventional electronic converter 10.

In fact, the energy transfer between the input port 100, 102 and the output port 104, 106 of an electronic converter 10 usually takes place by means of an (external) inductor (not shown in FIG. 1) which is alternatively couplable to the input terminal 100 and to the output terminal 104 by means of at least one electronic switch in the electronic converter 10.

Typically, the (external) inductor is coupled to the input terminal 100 in a first portion of a switching cycle of the electronic converter 10 (i.e., the so-called ON state of the electronic converter 10), in order to store energy provided by the voltage source BAT, and is coupled to the output terminal 104 in a second portion of the switching cycle of the electronic converter 10 (i.e., the so-called OFF state of the electronic converter 10), in order to provide (at least partially) the energy stored in the inductor to the output load OL.

It will be appreciated that definitions of ON and OFF states of a switching electronic converter 10 are conventionally known to the person skilled in the art, e.g. for buck, boost and buck-boost electronic converters, thus making unnecessary providing a more detailed description herein.

The amount of energy E stored in the (external) inductor at each ON/OFF switching cycle of the electronic converter 10 depends on the inductance L of the inductor and on the square of the current $I_L$ flowing therein, according to the following equation:

$$E_{inductor} = \frac{1}{2} L I_L^2$$

In certain applications, the inductance L of the (external) inductor used in combination with the electronic converter 10 may be low, e.g. in order to reduce the size and/or the cost of the inductive component coupled to the converter circuit. Therefore, achieving a satisfactory "energy transfer rate" with a small inductance L and a limited current $I_L$ without lowering the transfer efficiency may require improved solutions.

In the following FIGS. 2 to 5 parts, elements or components which have already been described with reference to FIG. 1 are denoted by the same references previously used in such figure. The description of such previously described elements will not be repeated in the following in order not to overburden the present detailed description.

As mentioned before, various embodiments of the present disclosure relate to an electronic converter 10, configured to receive a (DC) input voltage $V_{BAT}$ at an input port 100, 102 and to provide a regulated (DC) output voltage $V_{OUT}$ at an output port 104, 106.

Figure 2:
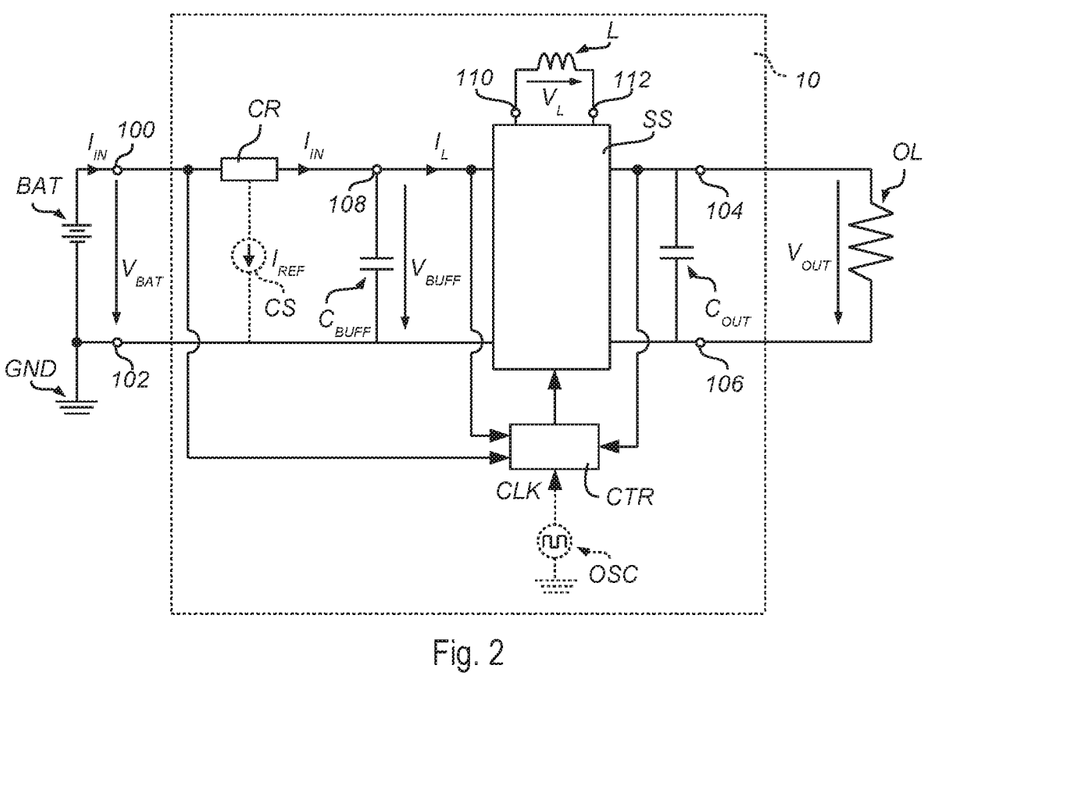
FIG. 2 shows an embodiment of an electronic converter configured to generate a regulated voltage in accordance with the present disclosure.

FIG. 2 shows the circuit architecture of an embodiment of an electronic converter 10 according to the present description.

In various embodiments, the electronic converter 10 comprises two input terminals 100 and 102 (i.e., an input port 100, 102) for connection to a (DC) voltage source providing an input voltage $V_{BAT}$. For example, the terminals 100 and 102 may be connected to a battery BAT. The (negative) terminal 102 is generally assumed as a reference terminal for voltages in the circuit, and may be optionally coupled to a ground GND.

In various embodiments, the electronic converter 10 comprises at least two output terminals 104 and 106 (i.e., an output port 104, 106) for providing a regulated (DC) output voltage $V_{OUT}$. The regulated (DC) output voltage $V_{OUT}$ may be provided to an output load OL possibly coupled to the output port 104, 106.

As previously described with reference to FIG. 1, in various embodiments the (negative) output terminal 106 may be coupled to the reference (ground) terminal GND, e.g. by connecting the (negative) output terminal 106 to the (negative) input terminal 102, but such coupling is not mandatory. The electronic converter 10 is configured to generate a regulated and substantially constant voltage $V_{OUT}$ between the terminals 104 and 106, and may generate a reference voltage for the (negative) output terminal 106 which is different from the ground voltage at the reference (ground) terminal GND.

In various embodiments, the electronic converter 10 has a current regulator circuit CR coupled between the (positive) input terminal 100 and an intermediate node 108, the current regulator circuit CR being configured for regulating the current $I_{IN}$ which may flow from the input terminal 100 to the intermediate node 108 to a certain desired value $I_{REG}$.

In various embodiments, the current regulator circuit CR additionally has a third terminal coupled to a reference current source CS (see FIG. 2, dotted lines). In such embodiments, the reference current source CS is coupled between the current regulator circuit CR and the terminal 102, and is configured to provide a reference current $I_{REF}$ which is sensed by the current regulator circuit CR.

In various embodiments, the value of the reference current $I_{REF}$ is kept constant during operation of the electronic converter 10, and a desired value $I_{REG}$ of the current $I_{IN}$ may be tuned by changing one or more parameter internal to the current regulator circuit CR.

Alternatively, the reference current $I_{REF}$ provided by the current source CS may be varied in order to tune the value $I_{REG}$ of the current $I_{IN}$ flowing through the current regulator circuit CR from the input terminal 100 to the intermediate node 108.

In various embodiments, the electronic converter 10 has a buffer capacitor $C_{BUFF}$ coupled between the intermediate node 108 and the (negative) input terminal 102.

In various embodiments, the electronic converter 10 has a switching stage SS having an input port coupled to the terminals 108 and 102 and an output port coupled to the output terminals 104 and 106.

The switching stage SS comprises a third port 110, 112 for coupling to an inductor L which stores and releases energy (ON state and OFF state of the switching stage SS, respectively) during the switching activity of the switching stage SS, thus allowing energy transfer from the input port 108, 102 to the output port 104, 106.

In various embodiments, the switching stage SS may comprise, for instance, a buck, boost or buck-boost stage.

In various embodiments, an output capacitor $C_{OUT}$ is provided within the electronic converter 10, coupled between the output terminals 104, 106 (i.e., in parallel to the output port of the switching stage SS and possibly to an output load OL).

Typically, the output capacitor $C_{OUT}$ has a greater capacitance than the buffer capacitor $C_{BUFF}$, which is coupled in parallel to the input port of the switching stage SS.

In various embodiments, operation of the switching stage SS is controlled by a control circuit CTR, which is configured to sense the voltage $V_{BUFF}$ at the intermediate node 108, the output voltage $V_{OUT}$ at the output node 104, and the input voltage $V_{BAT}$ at the input node 100. The control circuit CTR may draw a negligible current from such nodes 108, 104, 100.

Additionally, in various embodiments, the control circuit CTR is configured to receive a clock signal CLK provided by a clock generator circuit OSC (see FIG. 2, dotted lines). Therefore, the control circuit CTR may control operation of the switching stage SS in a synchronous mode with the clock signal CLK.

Figure 3:
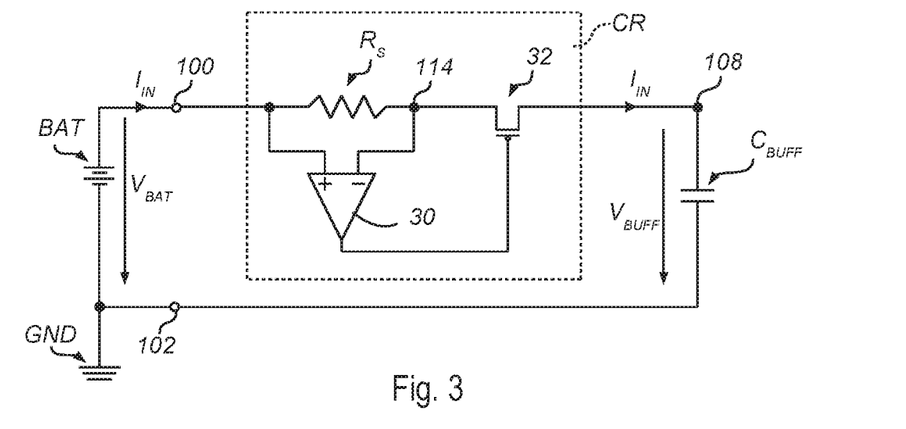
FIG. 3 shows a circuit diagram of a current regulator circuit adapted to operate in the electronic converter of FIG. 2.

FIG. 3 is exemplary of a possible implementation of a current regulator circuit CR for use, e.g., in an electronic converter 10 as exemplified in FIG. 2.

The current regulator circuit CR exemplified in FIG. 3 has a resistor $R_S$ coupled in series with a transistor 32. In particular, in the embodiment exemplified herein, the transistor 32 is a p-channel MOS transistor. The series of the resistor $R_S$ and the transistor 32 is coupled between the input terminal 100 and the intermediate node 108 of the electronic converter 10. An operational amplifier 30 has a non-inverting input coupled to the input terminal 100, and an inverting input coupled to a node 114 between the resistor $R_S$ and the transistor 32. The output of the operational amplifier 30 is coupled to the (gate) control terminal of the transistor 32.

Therefore, in a current regulator circuit CR as exemplified in FIG. 3, the current $I_{IN}$ flowing from the input terminal 100 to the intermediate node 108 is regulated to a certain value $I_{REG}$ by implementing a negative feedback control with the operational amplifier 30 and the transistor 32. The value $I_{REG}$ of the current $I_{IN}$ is a function of the value of the resistor $R_S$, the parameters of the operational amplifier 30 and the parameters of the transistor 32.

In fact, an increase (resp. decrease) of the current $I_{IN}$ would result in an increase (resp. decrease) of the voltage drop across the resistor $R_S$, thereby resulting in an increase (resp. decrease) of the gate voltage of the p-channel MOS transistor 32 through the operational amplifier 30, and thus a decrease (resp. increase) of the conductivity of the p-channel MOS transistor 32, facilitating thereby a regulation of the current $I_{IN}$ provided to the node 108 for charging the buffer capacitor $C_{BUFF}$.

In various embodiments, the value of the resistor $R_S$ in the current regulator circuit CR may be selected to be between $10\Omega$ and $200\Omega$, e.g. approximately $40\Omega$, resulting in a voltage drop across the resistor $R_S$ which typically does not exceed 20 mV.

Therefore, in various embodiments, the voltage drop between the input terminal 100 and the intermediate node 108 (i.e., the difference between the input voltage $V_{BAT}$ and the voltage $V_{BUFF}$ at the input port of the switching stage SS) is typically limited to at most 10% of the input voltage $V_{BAT}$, preferably being less than 5% of the input voltage $V_{BAT}$.

Additionally or alternatively, in various embodiments the resistor $R_S$ may be a variable resistor, thus providing the possibility of tuning the value $I_{REG}$ of the current $I_{IN}$ flowing through the current regulator circuit CR.

It will be noted that possible implementations of a current regulator circuit CR in embodiments are not limited to the topology illustrated in FIG. 3, which is described herein by way of example only.

In general, any circuit topology providing a regulated current $I_{IN}$ and a low voltage drop between terminals 100 and 108 may be used as a current regulator circuit CR in embodiments of an electronic converter 10. A low voltage drop across the current regulator circuit CR facilitates limiting energy dissipation in the current regulator circuit CR, thus increasing the energy efficiency of the electronic converter 10.

Figure 4:
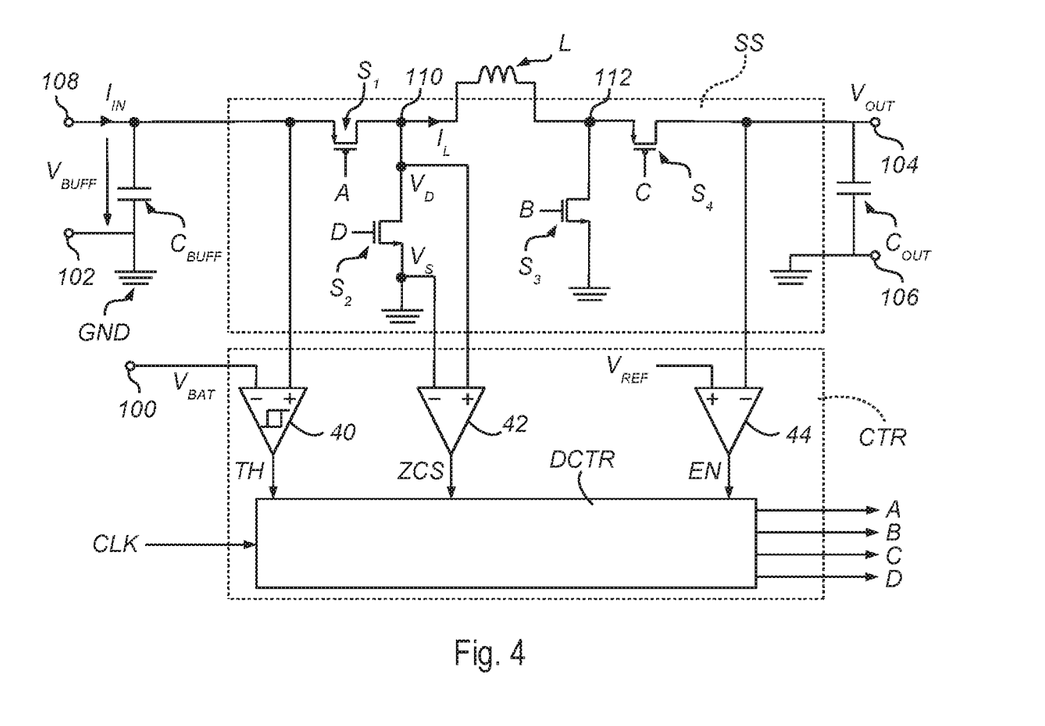
FIG. 4 is exemplary of implementation details of an electronic converter according to FIG. 2.

FIG. 4 shows a possible embodiment of a switching stage SS and a control circuit CTR for transferring energy from the buffer capacitor $C_{BUFF}$ to the output capacitor $C_{OUT}$ in an electronic converter 10 as exemplified in FIG. 2.

In the embodiment of FIG. 4, an otherwise conventional 4-switches buck-boost switching stage SS is considered. In such architecture, a first switch $S_1$ is coupled between the terminal 108 and a first terminal 110 of an (external) inductor L; a second switch $S_2$ is coupled between the first terminal 110 of the inductor L and a reference (ground) terminal GND; a third switch $S_3$ is coupled between a second terminal 112 of the inductor L and the reference (ground) terminal GND; and a fourth switch $S_4$ is coupled between the second terminal 112 of the inductor L and the output terminal 104.

In the embodiment considered herein, switches $S_1$, $S_2$, $S_3$, $S_4$ are MOS transistors. However, any kind of electronic switch may be used in place of MOS transistors.

As exemplified in FIG. 4, a control circuit CTR is configured to generate control signals A, B, C, D for controlling the respective switches $S_1$, $S_3$, $S_4$, $S_2$ in the switching stage SS, thereby determining the state of the switching stage SS (e.g., ON or OFF).

For instance, in various embodiments (see, e.g., FIG. 4), switches $S_1$ and $S_3$ being in a conductive state and switches $S_2$ and $S_4$ being in a non-conductive state result in the switching stage SS being in the ON state, wherein the inductor L is coupled in parallel to the buffer capacitor $C_{BUFF}$. Conversely, switches $S_1$ and $S_3$ being in a non-conductive state and switches $S_2$ and $S_4$ being in a conductive state result in the switching stage SS being in the OFF state, wherein the inductor L is coupled in parallel to the output capacitor $C_{OUT}$.

As previously described, as a result of the switching stage SS being in the ON state, energy is transferred from the buffer capacitor $C_{BUFF}$ to the inductor L; while as a result of the switching stage SS being in the OFF state, energy is transferred from the inductor L to the output capacitor $C_{OUT}$.

It will be appreciated that reference to a 4-switches buck-boost switching stage SS is made in the present description by way of example only, since such architecture is quite general and allows to obtain other kinds of switching stages (e.g., buck or boost) with simple modifications.

For instance, a buck switching stage may be obtained starting from the architecture of FIG. 4 by eliminating the switch $S_3$ and substituting the switch $S_4$ with a direct coupling between the second terminal 112 of the inductor L and the output terminal 104. In this case, the switching stage SS would be in the ON state when the switch $S_1$ is conductive and the switch $S_2$ is non-conductive, and in the OFF state when the switch $S_1$ is non-conductive and the switch $S_2$ is conductive.

A simplified buck switching stage may be obtained by additionally substituting the switch $S_2$ with a diode having cathode coupled to the first terminal 110 of the inductor L and anode coupled to the reference (ground) terminal GND. Thus, in this case the switching stage SS would be in the ON state when the switch $S_1$ is conductive and in the OFF state when the switch $S_1$ is non-conductive.

Similarly, a boost switching stage may be obtained starting from the architecture of FIG. 4 by eliminating the switch $S_2$ and substituting the switch $S_1$ with a direct coupling between the first terminal 110 of the inductor L and the terminal 108. In this case, the switching stage SS would be in the ON state when the switch S₃ is conductive and the switch S₄ is non-conductive, and in the OFF state when the switch S₃ is non-conductive and the switch S₄ is conductive.

A simplified boost switching stage may be obtained by additionally substituting the switch S₄ with a diode having cathode coupled to the output terminal 104 and anode coupled to the second terminal 112 of the inductor L. Thus, in this case the switching stage SS would be in the ON state when the switch S₃ is conductive and in the OFF state when the switch S₃ is non-conductive.

Therefore, it will be understood that reference to a 4-switches buck-boost switching stage SS as shown in FIG. 4 is by way of example only, and that the present disclosure is not limited to such specific case.

In various embodiments, a control circuit CTR comprises a comparator with hysteresis 40, which compares the voltage $V_{BUFF}$ at terminal 108 with a lower voltage threshold $V_{TH,L}$ and an upper voltage threshold $V_{TH,H}$ generated as a function of the voltage $V_{BAT}$ at terminal 100, thereby generating a digital signal TH indicative of the input voltage $V_{BUFF}$ reaching the upper threshold $V_{TH,H}$ or the lower threshold $V_{TH,L}$. A comparator 44 compares the output voltage $V_{OUT}$ at terminal 104 with a certain reference value $V_{REF}$ (e.g., 3.0 V), thereby generating a digital signal EN indicative of the output voltage $V_{OUT}$ being higher or lower than the reference value $V_{REF}$. A digital control circuit DCTR receives at least the digital signals TH and EN and generates the control signals A, B, C, D for controlling the respective switches in the switching stage SS.

It will be understood that the lower voltage threshold $V_{TH,L}$ and the upper voltage threshold $V_{TH,H}$ may be generated as a function of the voltage $V_{BAT}$ by means of circuitry which is not explicitly visible in the annexed Figures, e.g. such circuitry may be part of the comparator with hysteresis 40. For instance, a resistive network (not visible in the Figures) coupled to an operational amplifier may provide a comparator with hysteresis 40, with the possibility of tuning the values of the thresholds $V_{TH,L}$ and $V_{TH,H}$ with respect to the voltage $V_{BAT}$ by choosing the values of the components in the resistive network. Such implementation of a comparator with hysteresis is known in the art, which makes unnecessary providing a more detailed description herein.

Alternatively, other circuits may be implemented for generating the thresholds $V_{TH,L}$ and $V_{TH,H}$ as a function of the voltage $V_{BAT}$ externally to the comparator 40.

Additionally, in various embodiments the control circuit CTR has an additional comparator 42, having a first input coupled to the first terminal 110 of the inductor L and a second input coupled to the reference (ground) terminal. Specifically, in the embodiment considered in FIG. 4, the comparator 42 is configured to sense the voltage drop across the switch S₂, which is an n-channel MOS transistor. Thus, the comparator 42 is configured to sense the drain-source voltage $V_D$-$V_S$ of the MOS transistor.

By sensing the voltage drop across the switch S₂, and particularly by sensing the sign of such voltage drop, the comparator 42 generates a digital signal ZCS which is indicative of the direction of the current $I_L$ flowing in the inductor L. For instance, in the embodiment considered herein, the digital signal ZCS may be high when $V_D$>$V_S$, this condition being indicative of the current $I_L$ in the inductor L flowing from the output terminal 104 towards ground through the switch S₂.

Alternatively, other sensing architectures may be involved in various embodiments, configured for detecting the direction of the current $I_L$ flowing in the inductor L and generating thereby the digital signal ZCS. For instance, it will be understood that in case the switching stage SS is implemented as a boost stage (i.e., without the switch S₂), a different sensing architecture may be implemented for generating the digital signal ZCS indicative of the direction of the current $I_L$ flowing in the inductor L.

In various embodiments, also the digital signal ZCS may be received by the digital control circuit DCTR for controlling the switching stage SS.

Additionally, in various embodiments, the control circuit CTR is configured to receive a clock signal CLK generated by a clock generator circuit OSC (not visible in FIG. 4).

A first advantage of various embodiments over known electronic converters is obtained by means of the current regulator circuit CR cooperating with the buffer capacitor $C_{BUFF}$.

In fact, in various embodiments, the buffer capacitor $C_{BUFF}$ is charged with a regulated (and constant) current $I_{IN}$ provided at the output of the current regulator circuit CR. Thus, also the current provided by the (DC) voltage source BAT is regulated (and constant). In case the (DC) voltage source BAT is a battery, the battery BAT is protected from being subject to sharp current peaks resulting from the switching activity of the switching stage SS, increasing thereby the operating life of the battery BAT.

Current peaks which may be present in the current $I_L$ at the input of the switching stage SS may be provided by (partially) discharging the buffer capacitor $C_{BUFF}$.

As noted previously, in various embodiments the switching activity of the electronic converter 10 is controlled by the digital control circuit DCTR as a function of the signals EN, TH and optionally ZCS.

In particular, the electronic converter 10 may be configured to switch between two possible modes: An "IDLE" mode and an "ACTIVE" mode. In the "IDLE" mode, energy transfer from the buffer capacitor $C_{BUFF}$ to the output capacitor $C_{OUT}$ through the switching stage SS is inhibited as a result of the output voltage $V_{OUT}$ having reached a desired value (e.g., being higher than the reference value $V_{REF}$). The buffer capacitor $C_{BUFF}$ may be fully charged resulting in almost zero current being sunk from the voltage source BAT through the current regulator circuit CR.

In the "ACTIVE" mode, energy transfer from the buffer capacitor $C_{BUFF}$ to the output capacitor $C_{OUT}$ through the switching stage SS may be allowed as a result of the output voltage $V_{OUT}$ being lower than the desired value. The buffer capacitor $C_{BUFF}$ sinks a regulated current $I_{IN}$ from the voltage source BAT through the current regulator circuit CR.

Therefore, commutation of the electronic converter 10 between the IDLE and ACTIVE modes may be driven by the value of the digital signal EN. In fact, in various embodiments, the output voltage $V_{OUT}$ at the terminal 104 being higher (resp. lower) than the reference value $V_{REF}$ results in the digital signal EN being equal to 0 (resp. 1). Thus, the electronic converter 10 may be in the IDLE mode as a result of EN=0 and in the ACTIVE mode as a result of EN=1.

In various embodiments, the electronic converter 10 being in the IDLE mode may result in the switches S₂ and S₃ being in a conductive state, and the switches S₁ and S₄ being in a non-conductive state. According to such configuration of the switches in the switching stage SS, the input port and the output port of the switching stage SS are decoupled, and the inductor L is coupled to ground, thus resulting in the operation described above.

In various embodiments, the ACTIVE mode of the electronic converter 10 is divided, in turn, into two phases: a "RECHARGE" phase and a "SWITCHING" phase. In the "RECHARGE" phase, energy transfer from the buffer capacitor $C_{BUFF}$ to the output capacitor $C_{OUT}$ through the switching stage SS is inhibited as a result of the input voltage $V_{BUFF}$ having reached the lower threshold $V_{TH,L}$. The buffer capacitor $C_{BUFF}$ is charged with a current $I_{IN}$ provided by the voltage source BAT through the current regulator circuit CR.

In the "SWITCHING" phase, the control circuit CTR controls the commutation of one or more switches in the switching stage SS in order to allow energy transfer from the buffer capacitor $C_{BUFF}$ to the output capacitor $C_{OUT}$, with the buffer capacitor $C_{BUFF}$ sinking a regulated current $I_{IN}$ from the voltage source BAT through the current regulator circuit CR.

It will be noted that reference to "one or more switches" in the switching stage SS is made, since the number of switches in the switching stage SS may depend on the particular implemented architecture (e.g., buck, boost, buck-boost or others) as previously described.

Therefore, commutation of the electronic converter 10 between the RECHARGE and SWITCHING phases may be driven by the value of the digital signal TH. In fact, in various embodiments, the input voltage $V_{BUFF}$ at the terminal 108 reaching the higher (resp. lower) threshold $V_{TH,H}$ (resp. $V_{TH,L}$) results in a rising (resp. falling) edge of the digital signal TH. Thus, the electronic converter 10 may be in the RECHARGE phase as a result of TH=0 and in the SWITCHING phase as a result of TH=1.

In various embodiments, the electronic converter 10 being in the RECHARGE phase may result in the switches $S_2$ and $S_3$ being in a conductive state, and the switches $S_1$ and $S_4$ being in a non-conductive state, i.e. the switches $S_1$, $S_2$, $S_3$, $S_4$ being in the same configuration of the IDLE mode.

It will be understood that, despite being possibly characterized by a same configuration of the switches $S_1$, $S_2$, $S_3$, $S_4$, the IDLE mode and the RECHARGE phase may correspond to different electrical states of the converter 10 as well as different logic states of the digital control circuit DCTR.

Considering the electrical state of the converter 10, in IDLE mode the voltage $V_{BUFF}$ may be almost equal to the voltage $V_{BAT}$, thus countering current flow between node 100 and node 108, while in RECHARGE phase the voltage $V_{BUFF}$ may be between the two thresholds $V_{TH,L}$ and $V_{TH,H}$, thus resulting in a certain regulated current flow between node 100 and node 108.

Considering the logic states of the digital control circuit DCTR, the output signals A, B, C, D may be the same both in IDLE mode and in RECHARGE phase. In IDLE mode, the digital control circuit DCTR may be sensitive to the digital signal EN (only), while in RECHARGE phase the digital control circuit DCTR may be in a sort of "waiting" state, being sensitive to the digital signal TH and ready to switch to the SWITCHING phase.

In various embodiments, the upper threshold $V_{TH,H}$ and the lower threshold $V_{TH,L}$ may be defined as a function of the voltage $V_{BAT}$ provided by the voltage source BAT at terminals 100, 102. For instance, the following equations may apply:

$$V_{TH,H} = \alpha_H \cdot V_{BAT}$$

$$V_{TH,L} = \alpha_L \cdot V_{BAT}$$

wherein the parameters $\alpha_H$ and $\alpha_L$ may be tuned depending on the application, with $\alpha_L < \alpha_H$.

For instance, the value of the parameter $\alpha_H$ may be chosen close to unity, in order to provide a low voltage drop between terminals 100 and 108. However, the value of the parameter $\alpha_H$ should not be chosen too close to unity, since this would result in the voltage $V_{BUFF}$ at the terminal 108 never reaching the upper threshold $V_{TH,H}$ due to the parasitic voltage drop across the current regulator circuit CR.

Additionally, the average value of the voltage $V_{BUFF}$ should be kept close to the input voltage $V_{BAT}$ in order to reduce energy losses during the charging process of the buffer capacitor $C_{BUFF}$ by the voltage source BAT.

Therefore, the values of both parameters $\alpha_H$ and $\alpha_L$ may be chosen close to unity (yet still being $\alpha_L < \alpha_H$). In fact, the energy efficiency $\eta_{LIM}$ of the charging process of the buffer capacitor $C_{BUFF}$ may be notionally computed according to the following equation:

$$\eta_{LIM} = \frac{P_{OUT}}{P_{IN}} = \frac{V_{OUT}}{V_{IN}} = \frac{\frac{\alpha_H + \alpha_L}{2} V_{BAT}}{V_{BAT}} = \frac{\alpha_H + \alpha_L}{2}$$

which demonstrates that the energy efficiency $\eta_{LIM}$ of the charging process can be improved by having both parameters $\alpha_H$ and $\alpha_L$ close to unity.

For instance, the parameter $\alpha_H$ may have a value between 0.97 and 1.00, preferably equal to 0.99, and the parameter $\alpha_L$ may have a value between 0.90 and 0.95, preferably equal to 0.95.

It is noted that high values (e.g., close to unity) of the parameters $\alpha_H$ and $\alpha_L$ result in a high energy efficiency, but may also require a large buffer capacitor $C_{BUFF}$. Therefore, the parameters $\alpha_H$ and $\alpha_L$ may have values different from those listed above—purely by way of example—in order to provide a balance between the efficiency targets and the design constraints, e.g. constraints limiting the maximum capacitance of the buffer capacitor $C_{BUFF}$.

Also, it is noted that the difference $\alpha_H - \alpha_L$ should preferably not be lower than 0.3 in order to facilitate correct commutation of the control circuitry, e.g. of the comparator with hysteresis 40.

As described previously, commutations of the switches (e.g., $S_1$, $S_2$, $S_3$, $S_4$) of the switching stage SS are allowed only as a result of the electronic converter 10 being in the SWITCHING phase. While being in the SWITCHING phase, based on the input and output voltages $V_{BUFF}$ and $V_{OUT}$, the switching stage SS may be operated in different ways, as discussed e.g. in document "Buck-boost converter using the STM32F334 Discovery kit", STMicroelectronics Application Note 4449, September 2014.

An electronic converter 10 based on the architecture described with reference to FIGS. 2 and 4 may transfer from the buffer capacitor $C_{BUFF}$ to the output capacitor $C_{OUT}$ an amount of energy approximately equal to $E = \frac{1}{2} \cdot C_{BUFF} \cdot (V_{TH,H} - V_{TH,L})^2$ at each cycle of the electronic converter 10 comprising a RECHARGE phase and a subsequent SWITCHING phase.

In various embodiments, such amount of energy E may be transferred with a single "energy transfer act", i.e. with a single commutation of switches in the switching stage SS during each SWITCHING phase. For instance, the switching stage SS may commute to the ON state for the whole duration of the SWITCHING phase, while being in the OFF state for the whole duration of the RECHARGE phase.

In such operating modality, the digital control circuit DCTR may generate signals (e.g., A, B, C, D) for the operation of one or more switches in the switching stage SS as a function of the digital signals TH and EN, without the need for a clock signal CLK. In particular, it will also be appreciated that in such operating modality the digital signal ZCS may not be necessary for the operation of the digital control circuit DCTR, provided that the switch $S_4$ is substituted with a diode having cathode coupled to the output terminal 104 and anode coupled to the second terminal 112 of the inductor L for preventing the current $I_L$ from flowing from the output node 104 towards ground through the inductor L.

Additionally, the inventors have observed that the efficiency of energy transfer can be improved by splitting a single energy transfer act, transferring an amount E of energy, into N consecutive energy transfer acts, each of them transferring an amount E/N of energy. For example, in this context may be cited document "Energy Efficient Stepwise Charging of a Capacitor Using a DC-DC Converter With Consecutive Changes of its Duty Ratio", by S. Nakata et al., IEEE Transactions on Circuits and Systems I: Regular Papers, vol. 61, no. 7, July 2014, pages 2194-2203.

In fact, splitting a single energy transfer act into N consecutive energy transfer acts results in the peak current $I_L$ flowing into the inductor L being reduced, thus increasing the overall efficiency of the electronic converter 10, according to the following equation:

$$\frac{E_{LOSS(multi)}}{E_{LOSS(single)}} = \frac{R \cdot \frac{1}{3}(I_{MAX(multi)})^2 \cdot N \cdot T_{CLK}}{R \cdot \frac{1}{3}(\sqrt{N} \cdot I_{MAX(multi)})^2 \cdot \sqrt{N} \cdot T_{CLK}} = \frac{1}{\sqrt{N}}$$

wherein $E_{LOSS(multi)}$ is the energy lost for transferring a certain amount of energy in N consecutive energy transfer acts, $E_{LOSS(single)}$ is the energy lost for transferring the same amount of energy in a single energy transfer act, R is the resistance of the conductive path between the buffer capacitor $C_{BUFF}$ and the output capacitor $C_{OUT}$ (approximated to a resistance in series to the inductor L), $I_{MAX(multi)}$ is the peak current flowing in the inductor L in case the energy is transferred in N consecutive energy transfer acts, and $T_{CLK}$ is the duration of each of the N consecutive energy transfer acts.

Therefore, the energy transfer efficiency can be increased by increasing the number N of consecutive energy transfer acts, according to the following equation:

$$\eta_{multi} = \frac{E_{IN} - E_{LOSS(multi)}}{E_{IN}} = $$

$$\frac{E_{IN} - \frac{E_{LOSS(single)}}{\sqrt{N}}}{E_{IN}} = \eta_{single} + (1 - \eta_{single}) \cdot \left(1 - \frac{1}{\sqrt{N}}\right)$$

wherein $\eta_{multi}$ is the energy transfer efficiency when the energy is transferred in N consecutive energy transfer acts, and $\eta_{single}$ is the energy transfer efficiency when the energy is transferred in a single energy transfer act.

Various embodiments of an electronic converter 10 are configured for implementing a stepwise energy transfer from the buffer capacitor $C_{BUFF}$ to the output capacitor $C_{OUT}$, thereby providing an improved energy efficiency.

In the embodiment considered in FIG. 4, the digital control circuit DCTR may be configured to switch the switching stage SS between the ON and OFF states during the SWITCHING phase of the electronic converter 10 as a function of the digital signal ZCS and the clock signal CLK, in order to provide multiple energy transfer acts from the buffer capacitor $C_{BUFF}$ to the output capacitor $C_{OUT}$ during a single SWITCHING phase.

Figure 5:
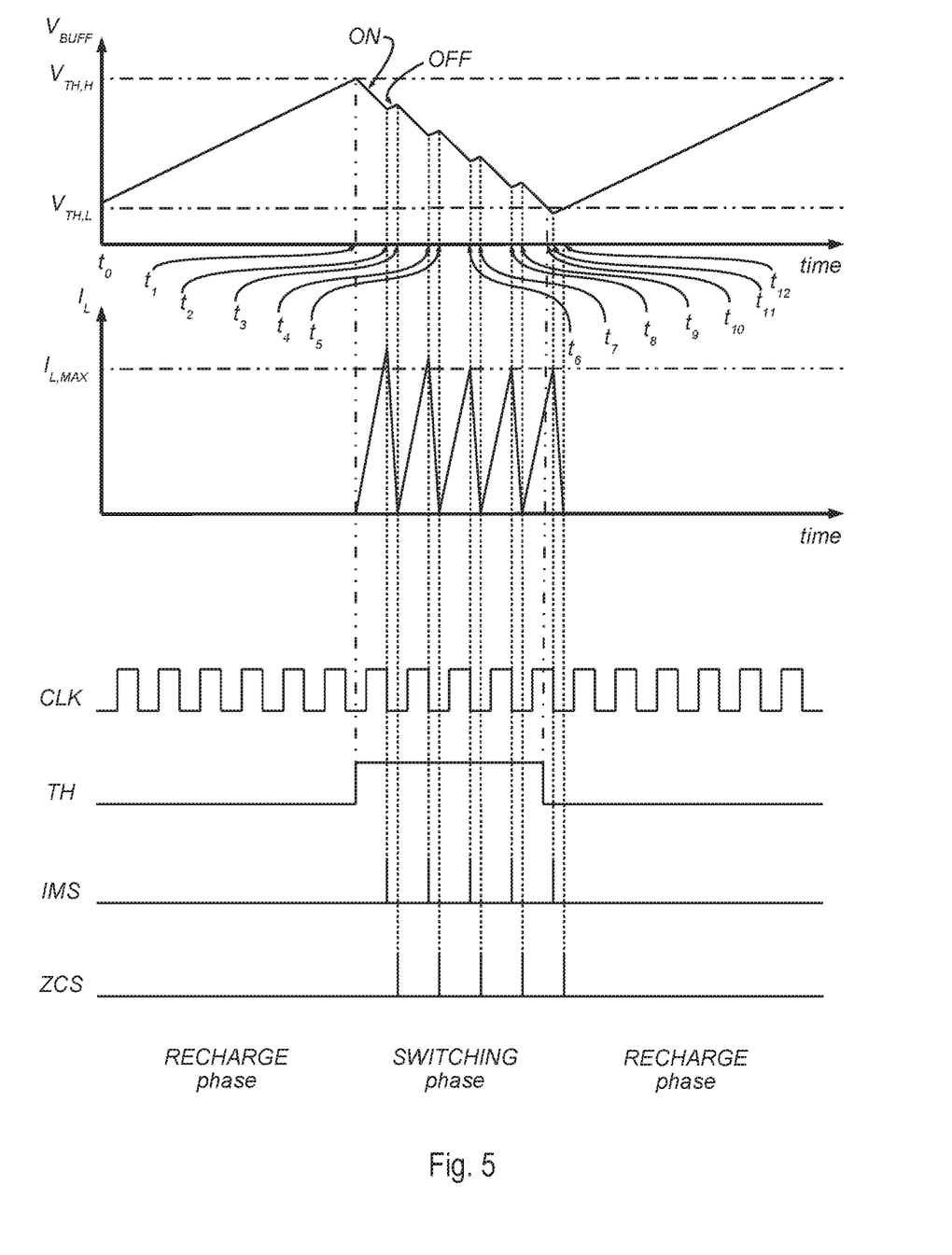
FIG. 5 shows exemplary waveforms of signals in the electronic converter of FIG. 4.

Therefore, various embodiments as exemplified in FIG. 4 may operate according to the exemplary signal waveforms shown in FIG. 5.

As shown in FIG. 5 (where the electronic converter 10 is assumed to be in the ACTIVE mode, i.e. EN=1), at an instant $t_0$ the electronic converter 10 switches to the RECHARGE phase since the voltage $V_{BUFF}$ has reached the lower threshold $V_{TH,L}$. In the RECHARGE phase, energy transfer from the input port to the output port of the switching stage SS is inhibited, thus the buffer capacitor $C_{BUFF}$ is charged with the (constant) current $I_{IN}$—possibly regulated by the current regulator circuit CR—resulting in the voltage $V_{BUFF}$ (linearly) increasing with a slope indicatively proportional to $I_{IN}$.

At a successive instant $t_1$, the voltage $V_{BUFF}$ reaches the upper threshold $V_{TH,H}$ and thus the digital signal TH goes to high. Assuming that the output voltage $V_{OUT}$ at the terminal 104 is lower than the reference value $V_{REF}$ (i.e., the signal EN is high), the electronic converter 10 switches to the SWITCHING phase.

In the SWITCHING phase, the switching stage SS switches between the ON and OFF states as a function of the digital signals IMS and ZCS with a frequency that is a function of the frequency of the clock signal CLK, thus resulting in a stepwise energy transfer from the input port to the output port of the switching stage SS which increases the energy transfer efficiency.

The digital signal IMS shown in FIG. 5 is generated (internally) by the digital control circuit DCTR according to the following rule:

if the digital signal TH is low, the digital signal IMS is low;

if the digital signal TH is high, the digital signal IMS has a pulse at every instant when the clock signal CLK has a:

falling edge, if the clock signal CLK is low when the digital signal TH goes high, or rising edge, if the clock signal CLK is high when the digital signal TH goes high.

When the electronic converter 10 switches to the SWITCHING phase at an instant $t_1$, the switching stage SS is initially set into the ON state. In the ON state, the buffer capacitor $C_{BUFF}$ sinks a (regulated) current $I_{IN}$ from the current regulator circuit CR and provides an increasing current $I_L$ to the inductor L, thus transferring energy to the inductor L. As a result of the current $I_L$ being higher than the (regulated) current $I_{IN}$, the voltage $V_{BUFF}$ decreases. The switching stage SS remains in the ON state until a pulse is sensed in the digital signal IMS by the digital control circuit DCTR, e.g. at an instant $t_2$.

As a result of a pulse being sensed in the digital signal IMS at instant $t_2$, the switching stage SS switches to the OFF state, wherein the buffer capacitor $C_{BUFF}$ sinks a (regulated) current $I_{IN}$ from the current regulator circuit CR without providing current to the inductor L. Therefore, the voltage $V_{BUFF}$ increases and the current $I_L$ flowing in the inductor L decreases.

As a result of the current $I_L$ flowing in the inductor L decreasing to zero, e.g. at an instant $t_3$, the digital signal ZCS generated at the output of the comparator 42 goes to high, triggering the commutation of the switching stage SS to the ON state again.

Commutation of the switching stage SS between the ON and OFF states continues as long as both signals TH and EN are high, i.e. as long as the electronic converter 10 is in the SWITCHING phase, with the ON→OFF transitions being triggered by pulses of the digital signal IMS, and the OFF→ON transitions being triggered by pulses of the digital signal ZCS. See for instance FIG. 5, wherein the following transitions are illustrated:

$t_4$: ON→OFF,
$t_5$: OFF→ON,
$t_6$: ON→OFF,
$t_7$: OFF→ON,
$t_8$: ON→OFF,
$t_9$: OFF→ON,
$t_{11}$: ON→OFF.

At an instant $t_{10}$ when the digital signal TH goes to low, despite the electronic converter 10 switching to the RECHARGE phase, the switching stage SS completes the ongoing energy transfer act. Thus, if the switching stage SS is in the ON state when the electronic converter 10 switches to the RECHARGE phase, the switching stage SS remains in the ON state until a next occurrence of a pulse in the digital signal IMS (see, e.g., instant $t_{11}$ in FIG. 5). As a result of the electronic converter 10 being in the RECHARGE phase, the switching stage SS does not commute to the ON state even if a pulse occurs in the signal ZCS (see, for instance, instant $t_{12}$ in FIG. 5).

The electronic converter 10 switches again to the SWITCHING phase in case the signal TH commutes to high again.

In various embodiments, the digital signal IMS is generated in such a way that the first ON state of the switching stage SS in the SWITCHING phase of the electronic converter 10 has a duration of at least half clock period.

In fact, the ON state being too short (e.g., less than half clock period) may result in the comparators 40, 42, 44 not being able to correctly detect the respective signals crossing thresholds. In such case, operation of the electronic converter 10 may be adversely affected.

Also, in various embodiments, the switching stage SS does not switch from the ON state to the OFF state as soon as at least one of signals TH and EN goes to low. Before switching to the OFF state, the ongoing energy transfer act is completed in order to facilitate correct operation of comparators 40, 42, 44 and reduce the possibility of malfunctions of the electronic converter 10.

In general, in various embodiments, as a result of the electronic converter 10 being in the SWITCHING phase, the control circuit block CTR may be configured to control the switching stage SS by periodically switching the switching stage SS to an OFF state, and switching the switching stage SS to an ON state as a result of the current $I_L$ flowing through the inductor L reaching zero.

Thus, in various embodiments, the electronic converter 10 in the SWITCHING phase may operate according to a "constant on-time and transition mode off" operational scheme, since the transitions from the ON state to the OFF state are triggered by rising or falling edges of the clock signal CLK (i.e., by pulses of the digital signal IMS) and the transitions from the OFF state to the ON state are triggered by pulses of the digital signal ZCS, indicative of the current flowing in the inductor L changing direction.

In various embodiments, the on-time (i.e., the duration of the ON state in the SWITCHING phase) may comprise multiple clock cycles. For instance, the digital signal IMS may have a pulse every second rising/falling edge of the clock signal CLK. In general, the digital signal IMS may have a pulse every n rising/falling edges of the clock signal CLK, resulting in the on-time lasting for n clock cycles.

In various embodiments, the digital control circuit DCTR can be implemented as a mixed sequential and combinational logic circuit.

Most of the components of the electronic converters 10 described in the foregoing may also be integrated in an integrated circuit. Generally, the term integrated circuit does not imply that the die is mounted within a package, but e.g. the die could also be mounted directly on a printed-circuit-board (PCB). Thus, the term pad is used to identify the pad of the die of the integrated circuit and the term pin identifies the pin or lead of an optional external package of the integrated circuit. Thus, when using the term "pad/pin" this indicates that the die has a pad and in case an external package is used, also the package has a corresponding pin, which is connected to the respective pad.

For example, such integrated circuit may include:
two pins/pads 100 and 102 for connection to the supply voltage $V_{BAT}$;
two pins/pads 104 and 106 for connection to an output capacitor $C_{OUT}$, providing a regulated output voltage $V_{OUT}$ thereto;
two pins/pads 108 and 102 for connection to an input buffer capacitor $C_{BUFF}$;
the switching stage SS, having two pins/pads 110 and 112 for connection to an inductor L;
optionally the current regulator circuit CR, with or without the resistor $R_S$; and
optionally the control circuit CTR.

It will be appreciated that, in order to allow coupling of such integrated circuit to both a voltage source BAT and an input buffer capacitor $C_{BUFF}$, the node 102 may have two corresponding pins/pads.

In various embodiments, the integrated circuit does not comprise large inductors, capacitors and resistors, such as the inductor L and the capacitors $C_{BUFF}$ and $C_{OUT}$, i.e. these components are external with respect to the integrated circuit. Conversely, small capacitors and the various resistors described may be external or internal.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:
1. An electronic converter comprising:
a first input terminal and a second input terminal configured to receive a supply voltage therebetween;
a first output terminal and a second output terminal configured to provide a regulated voltage therebetween;
a current regulator circuit arranged between the first input terminal and an intermediate node in the electronic converter, the current regulator circuit configured to regulate, to a certain regulated value, current flowing between the first input terminal and the intermediate node;
an input capacitor arranged between the intermediate node and the second input terminal;
a switching stage having an input port coupled to the intermediate node and the second input terminal, and an output port coupled to the first output terminal and the second output terminal;
an output capacitor arranged between the first output terminal and the second output terminal; and a control circuit block configured to:
sense an input voltage at the intermediate node and the regulated voltage at the first output terminal;
compare the regulated voltage to a reference value and generate a first signal having first and second values indicative of the regulated voltage being higher or lower than the reference value, respectively;
compare the input voltage to a lower threshold and an upper threshold and generate a second signal having respective first and second values indicative of the input voltage reaching either one of the lower or the upper threshold, respectively;
switch the electronic converter between an active mode and an idle mode as a function of the first signal, wherein a regulated current flows through the current regulator circuit between the first input terminal and the intermediate node to charge the input capacitor in the active mode, and wherein energy transfer from the input capacitor to the output capacitor is inhibited and current flow through the current regulator circuit between the first input terminal and the intermediate node is discontinued in the idle mode; and
as a result of the electronic converter being in the active mode, switch the electronic converter between a recharge phase and a switching phase as a function of the second signal, wherein energy transfer from the input capacitor to the output capacitor is inhibited in the recharge phase, and wherein switching of one or more electronic switches in the switching stage is controlled by the control circuit block to enable energy transfer from the input capacitor to the output capacitor in the switching phase.

2. The electronic converter according to claim 1, wherein the control circuit block is configured to switch the electronic converter to:
the idle mode, as a result of the first signal having the first value which is indicative of the regulated voltage being higher than the reference value, and
the active mode, as a result of the first signal having the second value which is indicative of the regulated voltage being lower than the reference value.

3. The electronic converter according to claim 2, wherein the control circuit block is configured to switch, as a result of the electronic converter being in the active mode, the electronic converter to:
the recharge phase, as a result of the second signal having the first value indicative of the input voltage having reached the lower threshold; and
the switching phase, as a result of the second signal having the second value indicative of the input voltage having reached the upper threshold.

4. The electronic converter according to claim 1, wherein the switching stage comprises a buck switching stage, a boost switching stage, or a buck-boost switching stage.

5. The electronic converter according to claim 1, wherein the certain regulated value of the current flowing between the first input terminal and the intermediate node as a result of the electronic converter being in the active mode is tunable by sensing a reference current generated by a reference current source coupled to the current regulator circuit.

6. The electronic converter according to claim 1, wherein the certain regulated value of the current flowing between the first input terminal and the intermediate node as a result of the electronic converter being in the active mode is tunable by tuning the value of a variable component provided in the current regulator circuit.

7. The electronic converter according to claim 1, wherein the lower and the upper thresholds are generated as a function of the supply voltage, with the lower threshold having a value between 90% and 95% of the supply voltage and the upper threshold having a value between 97% and 100% of the supply voltage.

8. The electronic converter according to claim 1, wherein the lower and the upper thresholds are generated as a function of the supply voltage, with the lower threshold having a value equal to about 95% of the supply voltage, and the upper threshold having a value equal to about 99% of the supply voltage.

9. The electronic converter according to claim 1, wherein the switching stage is configured to be switched a plurality of times to an ON state and to an OFF state during the switching phase of the electronic converter.

10. The electronic converter according to claim 1, further comprising an inductor configured to provide a current flow path between the input capacitor and the output capacitor, the inductor coupled to an inductor port of the switching stage.

11. The electronic converter according to claim 10, wherein the control circuit block is configured to sense a current flowing through the inductor and to control the switching stage, as a result of the electronic converter being in the switching phase, by:
periodically switching the switching stage to an OFF state; and
switching the switching stage to an ON state as a result of the current flowing through the inductor decreasing to zero.

12. The electronic converter according to claim 10, wherein the control circuit block is further configured to:
receive a clock signal generated by an oscillator circuit block;
sense a current flowing through the inductor and generate a third signal indicative of the current flowing through the inductor decreasing to zero;
generate a fourth signal having pulses in correspondence of rising or falling edges of the clock signal; and
as a result of the electronic converter being in the switching phase, control the switching stage by:
switching the switching stage to an ON state as a result of the third signal being indicative of the current flowing through the inductor having decreased to zero; and
switching the switching stage to an OFF state as a result of a pulse occurring in the fourth signal.

13. The electronic converter according to claim 12, wherein the fourth signal has pulses in correspondence of rising edges of the clock signal, as a result of the clock signal being high when the electronic converter switches to the switching phase, or falling edges of the clock signal, as a result of the clock signal being low when the electronic converter switches to the switching phase.

14. The electronic converter according to claim 12, wherein the fourth signal has pulses in correspondence of every $n^{th}$ rising or falling edge of the clock signal, n being an integer bigger or equal to one.

15. An integrated circuit comprising:
a first input pin/pad and a second input pin/pad configured to receive a supply voltage therebetween;
a first output pin/pad and a second output pin/pad configured to provide a regulated voltage therebetween, the first output pin/pad and the second output pin/pad being configured to be coupled to an output capacitor;

a current regulator circuit arranged between the first input pin/pad and an intermediate node, the current regulator circuit configured to regulate to a certain regulated value current flowing between the first input pin/pad and the intermediate node;

a first and a second pin/pad configured to be coupled to an input capacitor;

a switching stage having an input port coupled to the intermediate node and the second input pin/pad, and an output port coupled to the first output pin/pad and the second output pin/pad; and a control circuit block configured to:

sense an input voltage at the intermediate node and the regulated voltage at the first output pin/pad;

compare the regulated voltage to a reference value and generate a first signal having first and second values indicative of the regulated voltage being higher or lower than the reference value, respectively;

compare the input voltage to a lower and an upper threshold and generate a second signal having respective first and second values indicative of the input voltage reaching either one of the lower or the upper threshold, respectively;

switch the integrated circuit between an active mode and an idle mode as a function of the first signal, wherein a regulated current flows through the current regulator circuit between the first input pin/pad and the intermediate node to charge the input capacitor in the active mode, and wherein energy transfer from the input capacitor to the output capacitor is inhibited and current flow through the current regulator circuit between the first input pin/pad and the intermediate node is discontinued in the idle mode; and when the integrated circuit is in the active mode, switch the integrated circuit between a recharge phase and a switching phase as a function of the second signal, wherein energy transfer from the input capacitor to the output capacitor is inhibited in the recharge phase, and wherein switching of one or more electronic switches in the switching stage is controlled by the control circuit block to enable energy transfer from the input capacitor to the output capacitor in the switching phase.

16. A method of operating an electronic converter having first and second input terminals, first and second output terminals, a current regulator circuit arranged between the first input terminal and an intermediate node, an input capacitor arranged between the intermediate node and the second input terminal, and an output capacitor, the method comprising:

sensing an input voltage at the intermediate node;
sensing a regulated voltage at the first output terminal;
comparing the regulated voltage to a reference value;
generating a first signal having first and second values indicative of the regulated voltage being higher or lower than the reference value, respectively;
comparing the input voltage to a lower threshold and an upper threshold;
generating a second signal having first and second values indicative of the input voltage reaching either one of the lower or the upper threshold, respectively;
switching the electronic converter between an active mode and an idle mode as a function of the first signal, wherein a regulated current flows through the current regulator circuit between the first input terminal and the intermediate node to charge the input capacitor in the active mode, and wherein energy transfer from the input capacitor to the output capacitor is inhibited and current flow through the current regulator circuit between the first input terminal and the intermediate node is discontinued in the idle mode; and when the electronic converter is in the active mode, switching the electronic converter between a recharge phase and a switching phase as a function of the second signal, wherein energy transfer from the input capacitor to the output capacitor is inhibited in the recharge phase, and wherein switching of one or more electronic switches is controlled to enable energy transfer from the input capacitor to the output capacitor in the switching phase.

17. The method according to claim 16, wherein the electronic converter further comprises an inductor coupled between the input capacitor and the output capacitor, the method further comprising sensing a current flowing through the inductor and controlling the switching of the one or more electronic switches when the electronic converter is in the switching phase.

18. The method according to claim 17, wherein controlling the switching comprises:

periodically switching the one or more electronic switches to an OFF state; and switching the one or more electronic switches to an ON state as a result of the current flowing through the inductor decreasing to zero.

19. The method according to claim 17, further comprising:

receiving a clock signal;
sensing a current flowing through the inductor;
generating a third signal indicative of the current flowing through the inductor decreasing to zero;
generating a fourth signal having pulses in correspondence with rising or falling edges of the clock signal; and when the electronic converter is in the switching phase, control the switching of the one or more electronic switches by switching the one or more electronic switches to an ON state as a result of the third signal being indicative of the current flowing through the inductor having decreased to zero, and switching the one or more electronic switches to an OFF state as a result of a pulse occurring in the fourth signal.

20. The method according to claim 19, wherein the fourth signal has pulses in correspondence of rising edges of the clock signal, as a result of the clock signal being high when the electronic converter switches to the switching phase and falling edges of the clock signal, as a result of the clock signal being low when the electronic converter switches to the switching phase.

21. The method according to claim 19, wherein the fourth signal has pulses in correspondence of every $n^{th}$ rising or falling edge of the clock signal, n being an integer greater than or equal to one.

* * * * *